R. WUCHERER AND F. POLLITZER.
APPARATUS AND METHOD FOR SEPARATING THE CONSTITUENTS OF AIR OR OTHER GASEOUS MIXTURE.
APPLICATION FILED DEC. 29, 1914.
1,360,853. Patented Nov. 30, 1920.
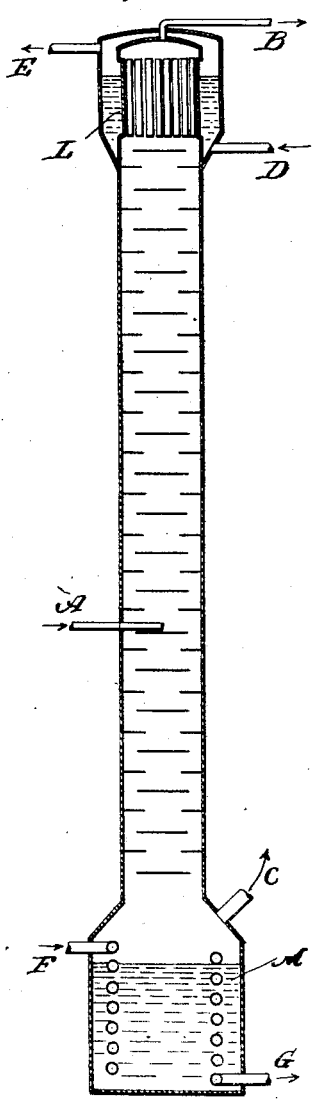
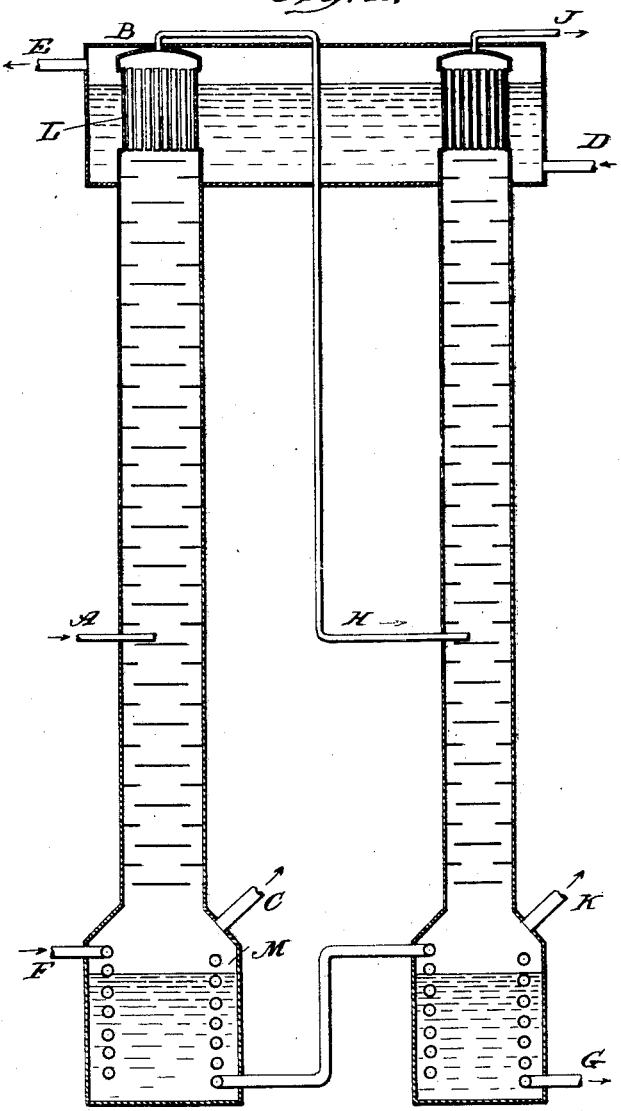
INVENTORS
Rudolf Wucherer &
Franz Pollitzer
BY
Briesen & Knauth
ATTORNEYS.

UNITED STATES PATENT OFFICE.

RUDOLF WUCHERER AND FRANZ POLLITZER, OF MUNICH, GERMANY, ASSIGNORS, BY MESNE ASSIGNMENTS, TO THE LINDE AIR PRODUCTS COMPANY, OF NEW YORK, N. Y., A CORPORATION OF OHIO.

APPARATUS AND METHOD FOR SEPARATING THE CONSTITUENTS OF AIR OR OTHER GASEOUS MIXTURES.

1,360,853.     Specification of Letters Patent.     Patented Nov. 30, 1920.

Application filed December 29, 1914. Serial No. 879,492.

*To all whom it may concern:*

Be it known that we, RUDOLF WUCHERER, a subject of the German Emperor, and FRANZ POLLITZER, a subject of the Emperor of Austria, and both residents of Munich, Germany, have jointly invented a new and useful Apparatus and Method for Separating the Constituents of Air or other Gaseous Mixtures, of which the following is a specification.

This invention relates to the separation of the constituents of gaseous mixtures, particularly of atmospheric air. For the sake of simplicity, we have restricted the description of our invention to the particular case of separating the constituents of air. Instead of air, we may treat according to our improved method, any other mixture of oxygen, nitrogen and argon or other gases, the properties of which as to the relative values of boiling points and mutual solubility are similar to the case of air.

According to this invention air is separated into oxygen, nitrogen and argon in the following way: At first, nitrogen (pure of nearly pure) is produced by any approved process, for instance according to U. S. Patents Nos. 795525; 815544 or 815601. The impure oxygen obtained simultaneously contains a large proportion of the argon contained in the air subjected to the treatment and is introduced at a suitable point into a special rectification column, this impure oxygen being either gaseous or partly or wholly liquefied.

To the rectification column heat is conveyed from below, whereas heat is withdrawn at its top, so that a fall of temperature is always maintained from the bottom to the top. The liquid rich in oxygen flows down in said column and is vaporized by the heat. The vapors ascend in the column and are washed by the descending liquid, from which they take up argon and nitrogen, while the liquid absorbs oxygen from the rising vapors, so that oxygen of any purity desired may be withdrawn at the foot of the column.

The vapors ascending from the point where the impure oxygen is admitted, are gradually deprived of oxygen, this being an effect of the rectification between these vapors and the liquid condensed in the upper portion of the column, so that the gaseous mixture leaving the column at the top consists chiefly of the argon and nitrogen, introduced into the column together with the liquid oxygen, and therefore said mixture contains a very large proportion of the argon contained in the air subjected to the treatment.

The important point is the separation of the impure oxygen into pure oxygen and a mixture containing chiefly argon and nitrogen, by rectification, that is to say, by mutual interaction of the liquid portions flowing downwardly and the ascending gaseous portions, which are not in equilibrium with the first mentioned liquids as to temperature and composition.

The performance of the process will now be described in detail with reference to the accompanying drawings, in which Figures 1 and 2 are vertical sections of two forms of apparatus suitable for carrying out our invention.

The mixture rich in oxygen, which is obtained in any well known manner, for example according to Letters Patent of the United States Nos. 795,525; 815,544 or or 815,601, enters in gaseous state, or partly or wholly liquefied into the rectification column at A. (Fig. 1). At the bottom of said column is a vessel M, which contains a liquid very rich in oxygen resulting from the rectification in the column, and in which oxygen vapors are produced by heat applied continuously for instance by means of a heating coil F, G; at the top a cooler L is placed, which is cooled for instance by liquid nitrogen. The cooling liquid enters at D, its vapors leave at E. The liquid produced in the cooler flows down in the column and meets the ascending vapors, a rectifying action being thus obtained, so that the mixture leaving at B contains comparatively little oxygen, but a large proportion of the argon and the nitrogen, which entered the column at A with the mixture. The liquid oxygen is gathered in the vessel under the column and escapes at C in the desired purity in liquid or gaseous state.

If the gaseous mixture containing argon and leaving at B, is to be deprived of nitrogen also, a further rectification column is preferably used according to Fig. 2, in which column the gas containing argon is introduced at H. In a manner quite similar to the one above described, this gas is separated in this second column into a gas consisting chiefly of nitrogen (leaving at J) and into a mixture escaping at K and consisting chiefly of argon and oxygen.

In order to produce gas containing a high percentage of argon and free from oxygen, the gaseous mixture escaping at B may be deprived of oxygen by chemical means before entering the second column, by treatment with reducing materials as for instance heated copper or hydrogen. If reducing gases (for instance hydrogen) are employed for removing oxygen, an excess of the latter is removed from the gaseous mixture together with the nitrogen while passing through the second rectification column.

The arrangements represented in Figs. 1 and 2 may be used in conjunction with an apparatus for producing oxygen or nitrogen from atmospheric air by means of liquefaction and rectification, the oxygen (of greater or less purity) produced in the nitrogen or oxygen apparatus being introduced, wholly or partly liquefied, into the rectification column according to the foregoing description serving for further separation without a previous heating, that is to say, such oxygen is introduced at the low temperature at which it is produced.

In a similar way the mixture containing argon and escaping from the first column in Fig. 2 at B may be introduced directly into the second column at H for further separation without previous heating.

The cooling of the upper portions of the two rectification columns may be performed by way of a common cooling-bath and similarly the heating of the two vessels at the bottom of the columns may be performed by using two heating coils connected in series as shown in Fig. 2.

As cooling-liquid for the two rectification columns represented in Fig. 2 we may employ nitrogen more or less purified, which is obtained by the separation of the original gaseous mixture. A particularly suitable way consists in combining the process just described with the process of the U. S. Patents Nos. 815544 and 881176 in the following manner: According to these two patents gaseous nitrogen of any desired purity is obtained under such pressure, as to be liquefied at the boiling point of oxygen. Part of this nitrogen is conducted under the said pressure into the heating coil F, G, in which it is liquefied, and then it is expanded to lower pressure and introduced into the cooler as a cooling liquid at D.

Instead of nitrogen, we may use oxygen obtained by the above process as a cooling liquid, boiling under a pressure lower than the pressure in the rectification column.

We claim:

1. The herein described process of fractionating gas-mixtures which consists in first producing a mixture rich in argon, and containing nitrogen, introducing such mixture into a rectifying column at an intermediate point of said column, abstracting, at a portion of said column above said point of introduction, a sufficient amount of heat to liquefy the argon, collecting the liquid at a point of the column below said point of introduction, supplying heat to such collected liquid to cause its vapors to rise to the heat-abstracting portion of the column and meet the descending liquid, and withdrawing argon, in gaseous form, above the level of the liquid, and clear of the path of the descending liquid, while the unliquefied remainder of the mixture is withdrawn at the upper portion of the column.

2. The herein described process of fractionating gas-mixtures which consists in first producing a mixture rich in argon and containing nitrogen, introducing such mixture into a rectifying column at an intermediate point of said column, abstracting, at a portion of said column above said point of introduction, a sufficient amount of heat to liquefy the argon, collecting the liquid at a point of the column below said point of introduction, and supplying heat to such collected liquid to cause its vapors to rise to the heat-abstracting portion of the column and meet the descending liquid, while the unliquefied remainder of the mixture is withdrawn at the upper portion of the column.

3. The herein described process of fractionating gas-mixtures which consists in first producing a mixture rich in a constituent which has a relatively high boiling point, introducing such mixture into a rectifying column at an intermediate point of said column, abstracting, at a portion of said column above said point of introduction, a sufficient amount of heat to liquefy the constituent portion of highest boiling point, collecting the liquid at a point of the column below said point of introduction, supplying heat to such collected liquid to cause its vapors to rise to the heat-abstracting portion of the column and meet the descending liquid, withdrawing the unliquefied remainder of the mixture at the upper portion of said column and introducing such remainder into another rectifying column at an intermediate point of said column, abstracting, at a portion of such second column above said point of introduction, a sufficient amount of heat to liquefy a constituent having a boiling point lower than the constituent liquefied in the first column, but higher than a remaining constituent, collecting the liquid at a portion of the second column below said point of introduction, supplying heat to such collected liquid to cause its vapors to rise to the heat-abstracting portion of said column and meet the descending liquid, withdrawing from the upper portion of said second column a mixture rich in the constituent having the lowest boiling point, and withdrawing from the lower portion of the column, a mixture rich in the constituent liquefied in said second column.

4. The herein described process of fractionating gas-mixtures which consists in first producing a mixture rich in a constituent which has a relatively high boiling point, introducing such mixture into a rectifying column at an intermediate point of said column, abstracting, at a portion of said column above said point of introduction, a sufficient amount of heat to liquefy the constituent portion of highest boiling point, collecting the liquid at a point of the column below said point of introduction, supplying heat to such collected liquid to cause its vapors to rise to the heat-abstracting portion of the column and meet the descending liquid, withdrawing the unliquefied remainder of the mixture at the upper portion of said column and introducing such remainder into another rectifying column at an intermediate point of said column, abstracting, at a portion of such second column above said point of introduction, a sufficient amount of heat to liquefy a constituent having a boiling point lower than the constituent liquefied in the first column, but higher than a remaining constituent, collecting the liquid at a portion of the second column below said point of introduction, supplying heat to such collected liquid to cause its vapors to raise to the heat-abstracting portion of said column and meet the descending liquid, withdrawing from the upper portion of said second column a mixture rich in the constituent having the lowest boiling point, and withdrawing, in gaseous form, a mixture rich in the constituent liquefied in said second column, from the lower portion of said column, above the level of the liquid, and clear of the path of the descending liquid.

5. The herein described process of obtaining a gas-mixture rich in argon which consists in first producing a mixture containing nitrogen and argon together with a higher percentage of oxygen than that present in atmospheric air, introducing such mixture into a rectifying column at an intermediate point of said column, abstracting at a point of said column above the point of introduction of said mixture, a sufficient amount of heat to liquefy oxygen while leaving argon and nitrogen in gaseous form, collecting the liquid oxygen at a point of the column below the point of introduction of said mixture, and vaporizing such collected liquid to cause its vapors to rise to the heat-abstracting portion of the column and meet the descending liquid.

6. The herein described process of obtaining a gas-mixture rich in argon which consists in first producing a mixture containing nitrogen and argon together with a higher percentage of oxygen than that present in atmospheric air, introducing such mixture into a rectifying column at an intermediate point of said column, abstracting at a point of said column above the point of introduction of said mixture, a sufficient amount of heat to liquefy oxygen while leaving argon and nitrogen in gaseous form, collecting the liquid oxygen at a point of the column below the point of introduction of said mixture, supplying heat to such collected liquid to cause its vapors to rise to the heat-abstracting portion of the column and meet the descending liquid, withdrawing oxygen above the level of such collected liquid, withdrawing the mixture rich in argon and nitrogen from the upper portion of said column and introducing such mixture into another rectifying column at an intermediate point of said column, abstracting, at a point of said second column above said point of introduction, a sufficient amount of heat to liquefy argon while leaving nitrogen in gaseous form, collecting the liquid argon at a point of the second column below said point of introduction, supplying heat to such collected liquid to cause its vapors to rise to the heat-abstracting portion of the column and meet the descending liquid, withdrawing a mixture rich in argon above the level of the collected liquid, and withdrawing a mixture rich in nitrogen from the upper portion of said second column.

7. The process of fractionally rectifying a mixture containing oxygen, argon, and nitrogen, with the percentage of oxygen higher than in atmospheric air, which consists in introducing said mixture at an intermediate point of a rectifying column, abstracting heat at the upper portion of said column to liquefy oxygen while leaving argon and nitrogen in gaseous form, supplying heat at the lower portion of the column to vaporize the liquid there collected and cause such vapors to rise and meet the descending liquid, withdrawing the gaseous mixture, rich in argon and nitrogen from the upper portion of said column and introducing it at an intermediate point of a second rectifying column, abstracting heat at the upper portion of said column to liquefy argon while leaving nitrogen in gaseous form, and supplying heat at the lower portion of said second column to vaporize the liquid there collected and cause the vapors thus produced to rise and meet the descending liquid.

8. Means for fractionating a mixture of liquid oxygen and argon comprising the combination of a rectification column, means for introducing said mixture at an intermediate point in said column, means for evaporating liquid at the foot of said column, a conduit for withdrawing gas at the foot of said column, means for refrigerating the gaseous mixture at the top of said column to the liquefying temperature of oxygen, means for returning the condensate to said column and means for conducting away the uncondensed gases rich in argon from the top of said column.

9. The process which consists in boiling a mixture comprising liquid oxygen and argon, introducing fresh portions of said liquid in contact with the ascending vapors from said liquid, withdrawing oxygen near the surface of said liquid, refrigerating the vapors at a region above the point of introduction of said liquid to condense oxygen, returning the condensed liquid in contact with the vapors ascending to said refrigerated region and conducting away the argon gaseous concentrate.

10. A process of obtaining from atmospheric air a gas mixture rich in argon, which comprises producing from the air a mixture poor in nitrogen but relatively rich in oxygen and argon, introducing said mixture into a separate rectifying column at a point intermediate its top and bottom, supplying heat to the bottom of said column, abstracting sufficient heat from the top of said column to there maintain a temperature which will liquefy oxygen but permit the existence of gaseous argon, withdrawing argon-enriched gases from the top of the column, and withdrawing oxygen near the bottom of the column.

11. A process of obtaining from atmospheric air a gas mixture rich in argon, which comprises separating the air into substantially pure nitrogen and a mixture rich in oxygen and argon, passing said mixture upward in a separate rectifying column through regions of progressively decreasing temperatures, refrigerating the top of said column by means of the nitrogen originally formed to a temperature which will liquefy oxygen but permit argon to exist in gaseous state, and withdrawing argon-enriched gases from the refrigerated region.

12. The herein described process of fractionating a gas mixture containing three constituents of different volatility, which comprises first removing a portion of the constituent of greatest volatility, then introducing the residual mixture into a separate fractionating tower at a point intermediate its top and bottom under conditions which will cause a portion of said mixture to liquefy, collecting liquid at the bottom of said column, supplying heat to boil the liquid so collected, cooling the top of the column to a temperature sufficiently low to liquefy the constituent of least volatility but permit the other constituents to maintain their gaseous state, said cooling being effected by thermal but not direct contact between the cooling medium and the gas mixture undergoing fractionation, withdrawing the highly volatile constituents near the said cooling region, and withdrawing the constituents of least volatility near the said heated region.

13. The herein described process of fractionating a gas mixture containing nitrogen, argon and oxygen, which comprises first removing a portion of the nitrogen, then introducing the residual mixture into a separate fractionating tower at a point intermediate its top and bottom under conditions which will cause a portion of said residual mixture to liquefy, collecting liquid at the bottom of said column, supplying heat to boil the liquid so collected, cooling the top of the liquid to a temperature sufficiently low to liquefy oxygen but permit the bulk of the argon to maintain its gaseous state, said cooling being effected by thermal but not direct contact between the cooling medium and the gas mixture undergoing fractionation, withdrawing the argon near the said cooled region, and withdrawing oxygen near the said heated region.

14. The herein described process of fractionating gas mixtures which consists in first producing a mixture rich in a constituent which has a relatively high boiling point, introducing such mixture into a rectifying column at an intermediate point of said column, abstracting, at a portion of said column above said point of introduction, a sufficient amount of heat to liquefy the constituent portion of highest boiling point, collecting the liquid at a point of the column below said point of introduction, supplying heat to such collected liquid to cause its vapors to rise to the heat-abstracting portion of the column and meet the descending liquid, and withdrawing such constituent having a relatively high boiling point, in gaseous form, above the level of the liquid, and clear of the path of the descending liquid, while the unliquefied remainder of the mixture is withdrawn at the upper portion of the column.

15. The herein described process of fractionating gas mixtures which consists in first producing a mixture rich in a constituent which has a relatively high boiling point, introducing such a mixture into a rectifying column at an intermediate point of said column, abstracting, at a portion of said column above said point of introduction, a sufficient amount of heat to liquefy the constituent portion of highest boiling point, collecting the liquid at a point of the column below said point of introduction, and supplying heat to such collected liquid to cause its vapors to rise to the heat-abstracting portion of the column and meet the descending liquid, while the unliquefied remainder of the mixture is withdrawn at the upper portion of the column.

Munich, the 4th day of December, 1914.

RUDOLF WUCHERER.
DR. FRANZ POLLITZER.

Witnesses:
Dr. HANS SCIFFINGER,
ERNST MONCH.